Oct. 19, 1971  W. A. LAUCK  3,613,236
AXIAL PIPE CUTTER

Filed May 16, 1969  3 Sheets-Sheet 1

INVENTOR.
William A. Lauck
BY
J. D. Douglas
His atty

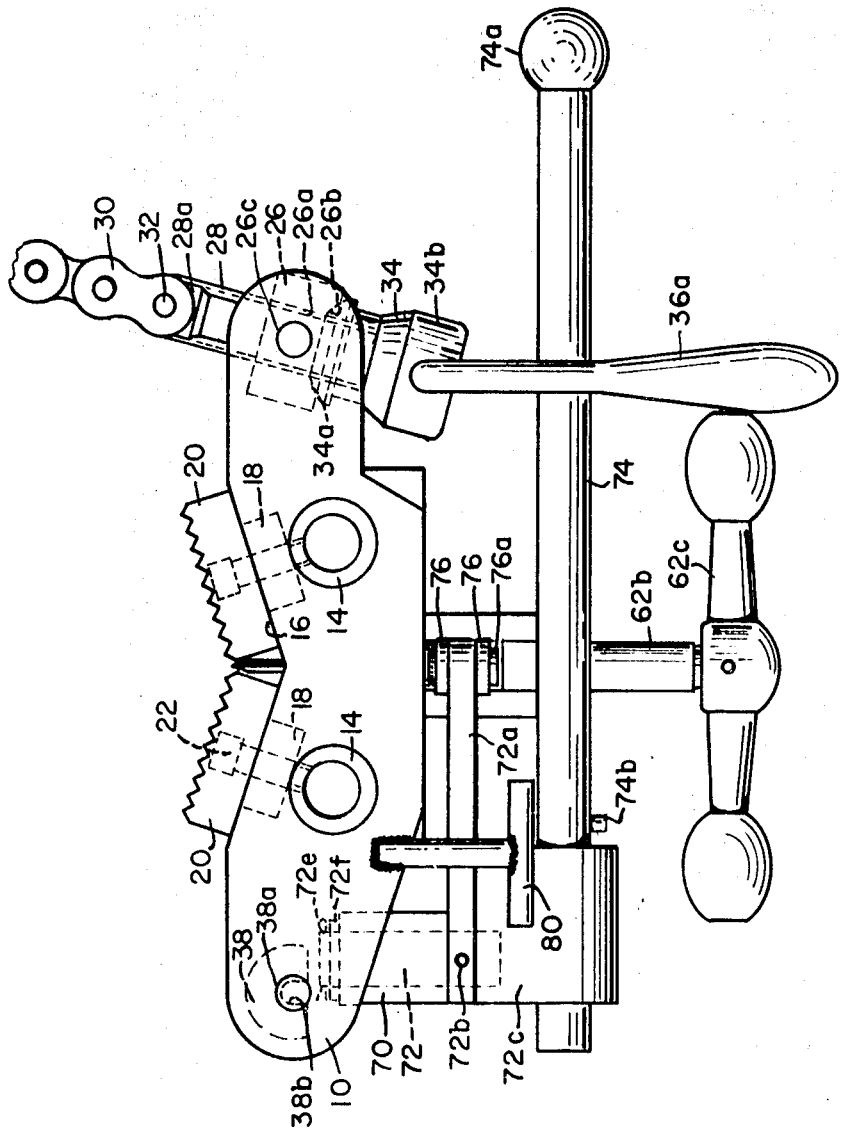

United States Patent Office 3,613,236
Patented Oct. 19, 1971

3,613,236
AXIAL PIPE CUTTER
William A. Lauck, Elyria, Ohio, assignor to Emerson
Electric Co., St. Louis, Mo.
Filed May 16, 1969, Ser. No. 825,152
Int. Cl. B23d *21/02, 21/08*
U.S. Cl. 30—92.5
10 Claims

ABSTRACT OF THE DISCLOSURE

A frame is provided and includes a pair of pipe clamping means with a pair of ways extending between the clamp means. A carriage is reciprocably mounted on the ways and carries one or more pipe cutting wheels which may be advanced by screw means into cutting relation with the pipe to make longitudinal cuts therein. A linkage is connected between the frame and carriage, operated by a handle, for reciprocating the carriage and the pipe cutting means longitudinally of the pipe.

---

This invention relates to a pipe cutting means and more particularly to a means for cutting longitudinally extending slits in a pipe.

It is well known that, in time, iron pipe gradually deteriorates to the point where it must be replaced. This requires digging up the old pipe, laying the new pipe and filling the trench. In many instances, particularly in gas lines, it has become the practice, instead of replacing the old pipe, to insert a plastic pipe the full length of the iron pipe. This reduces the cost greatly and provides a pipe that lasts for many years and still have the protection of the outer metal pipe. One of the problems, however, is to provide connections to the interior plastic pipe at the points where the various "take offs" occur. At such places it is necessary to cut open the iron pipe and expose the plastic pipe after which a suitable connection can be made. The cutting of the exterior pipe should be done in such a manner that the interior pipe is not damaged. Preferably the opening should be one made by the removal of a half section of the pipe although a narrower rectangular window can be made. The end, or transverse cuts for such a window are not too great a problem but the longitudinally extending cuts have been difficult to make.

The present invention contemplates a device which may be clamped on a pipe and having a carriage which carries one or more cutter wheels, that may be reciprocated longitudinally of the pipe as the cutter wheels are advanced into the pipe to make the longitudinal cuts. In practice a pair of end cuts are made by an ordinary pipe cutter and then a pair of spaced longitudinal slits are made in the pipe extending into the end cuts to cut a piece from the pipe in the form a rectangular window which may be removed to thus expose the interior plastic pipe.

Still other advantages of the invention and the invention itself will become more apparent from the following description of an embodiment thereof which is illustrated by the accompanying drawings and forms a part of this specification.

In the drawings:

FIG. 3 is an end view thereof with only a portion of the clamping chain shown.

Figure 1:
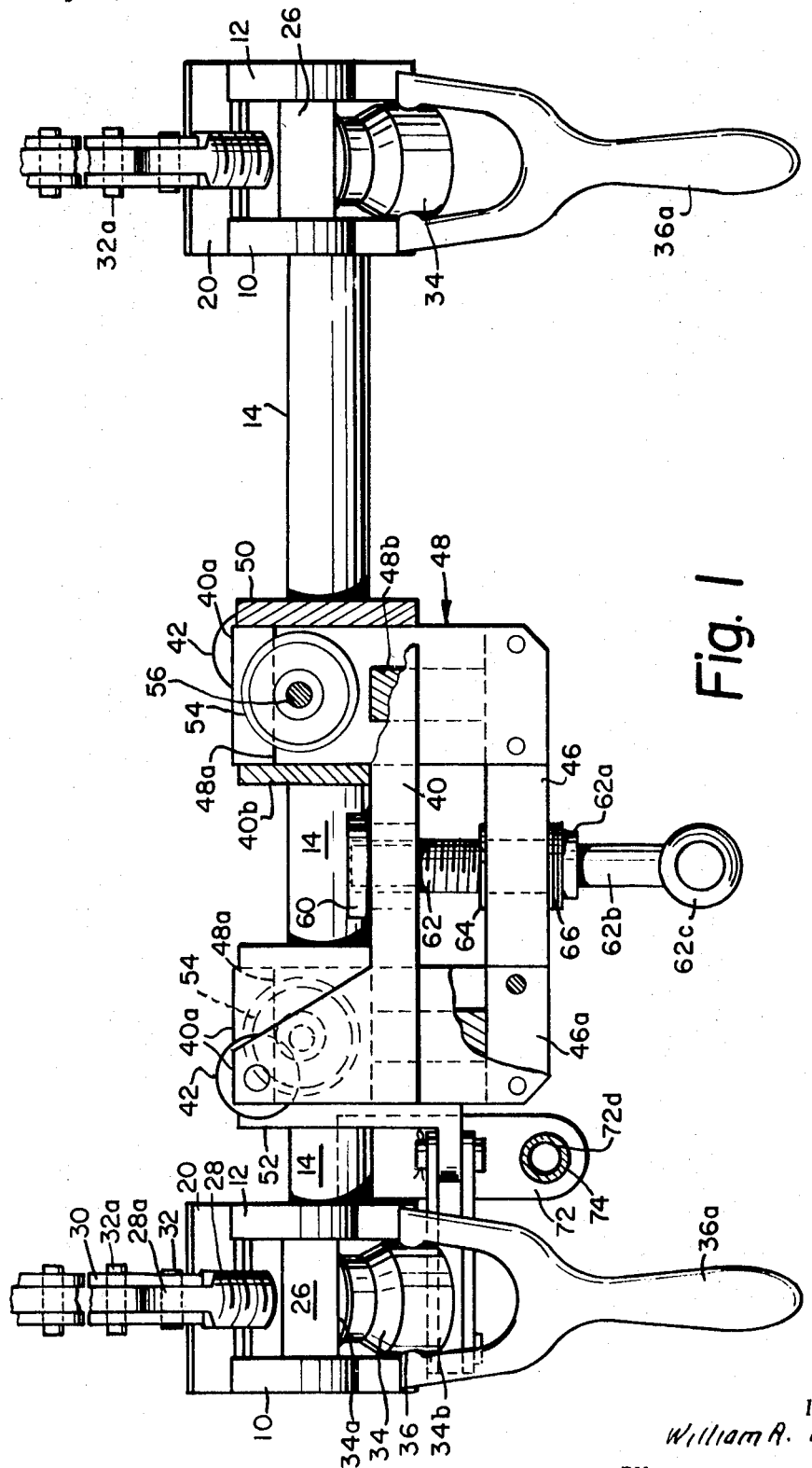
FIG. 1 is an elevational view of the invention with certain parts broken away to show the interior construction.

Briefly, the invention contemplates a pair of spaced supports and clamping means which may be secured to a pipe and have a pair of ways supported thereby. A carriage is reciprocably disposed on the ways and has a screw means which enables one or more cutter wheels to be advanced into the pipe. Means for reciprocating the carriage on the ways includes a handle operated lever carried on one of the supports and connected to the carriage by a link.

More specifically, there is provided a pair of base supports each of which includes a pair of plates 10 and 12 that are secured together in spaced relation on the ends of tubular ways 14. As best seen from FIG. 3, the plates are each profiled to provide a V shaped mid-portion 16. A pair of spacer blocks 18 are provided which extend between the plates adjacent their upper edges and a pair of serrated jaw blocks 20 are disposed on the upper edges of the plates on each side of the V shaped part 16 and held in place by screws 22, the heads of which are engaged in the jaw blocks and the stems of which extend through the spacer plates and are in threaded engagement with threaded openings in the ways 14 between the plates 10 and 12. It will be apparent that the clamp frames comprising the parts 10, 12 and 18 could all be made as one integral casting. Each of the supports is arranged to be clamped to the pipe that is to be slitted by a link chain which surrounds the pipe, one end being attached to the screw tightening means on one end of the support and the other part of the chain, after it has surrounded the pipe, being hooked into saddle members disposed on the other end of the support.

The tightening means includes a generally rectangular pivot block 26, pivotally secured between the ends of the support plates by pivot pins 26c carried by and secured in the plate and extending into diametrically opposed apertures on opposite sides of the pivot blank. The block has a bore 26a which opens at one end into a semi-spherical seat 26b. A tightening member which has a threaded shank 28 extends through the bore and has an eye 28a at one end to which the end of a link chain 30 is pivotally secured by a pin 32. The threads may be of the Acme type. A swivel nut 34 is threaded on the shank 28 and has a semi-spherical head end portion 34a which is seated in the seat 26b of the pivot block. The other end of the nut has an enlarged end portion 34b that is provided with diametrically opposite sockets into which the ends 36 of a Y shaped swivel handle 36a extend. The nut 34 may be turned in either direction by the swivably attached handle and threaded or unthreaded on the shank of the tightening screw. The nut bears against the pivot block and thus the screw 28 may be pulled to tighten the chain. The pivot block allows the entire screw assembly to pivot and thus provide a straight pull on the end of the chain, the angle of which varies with the size of the pipe.

The chain is of the type where the other link pins 32a extend laterally of the chain on each side. The free end of the chain is captured by a pair of saddle blocks, FIGS. 2 and 3, each of which has a semi-circular body 38 and a stem 38a that is inserted into an opening in the support plates 10–12. A seat 38b is provided in each block in which the extensions 32a of the link pins may be engaged. As can be seen from FIG. 3, these seats open away from the jaws 20.

It will be apparent that the two supports may be secured to a pipe to be slitted, with the ways 14 in spaced parallel relation to the pipe by bringing the tool up to the pipe, passing the chains around the pipe and hooking them into the saddle blocks after which the chain is tightened by rotating the nut 34 by the handle 36a to force the jaws 20 into secure holding engagement with the pipe.

The pipe is slit by a pair of cutter wheels carried on a support means which is in turn adjustably disposed on a carriage that is reciprocated longitudinally of the pipe on the ways.

Figure 2:
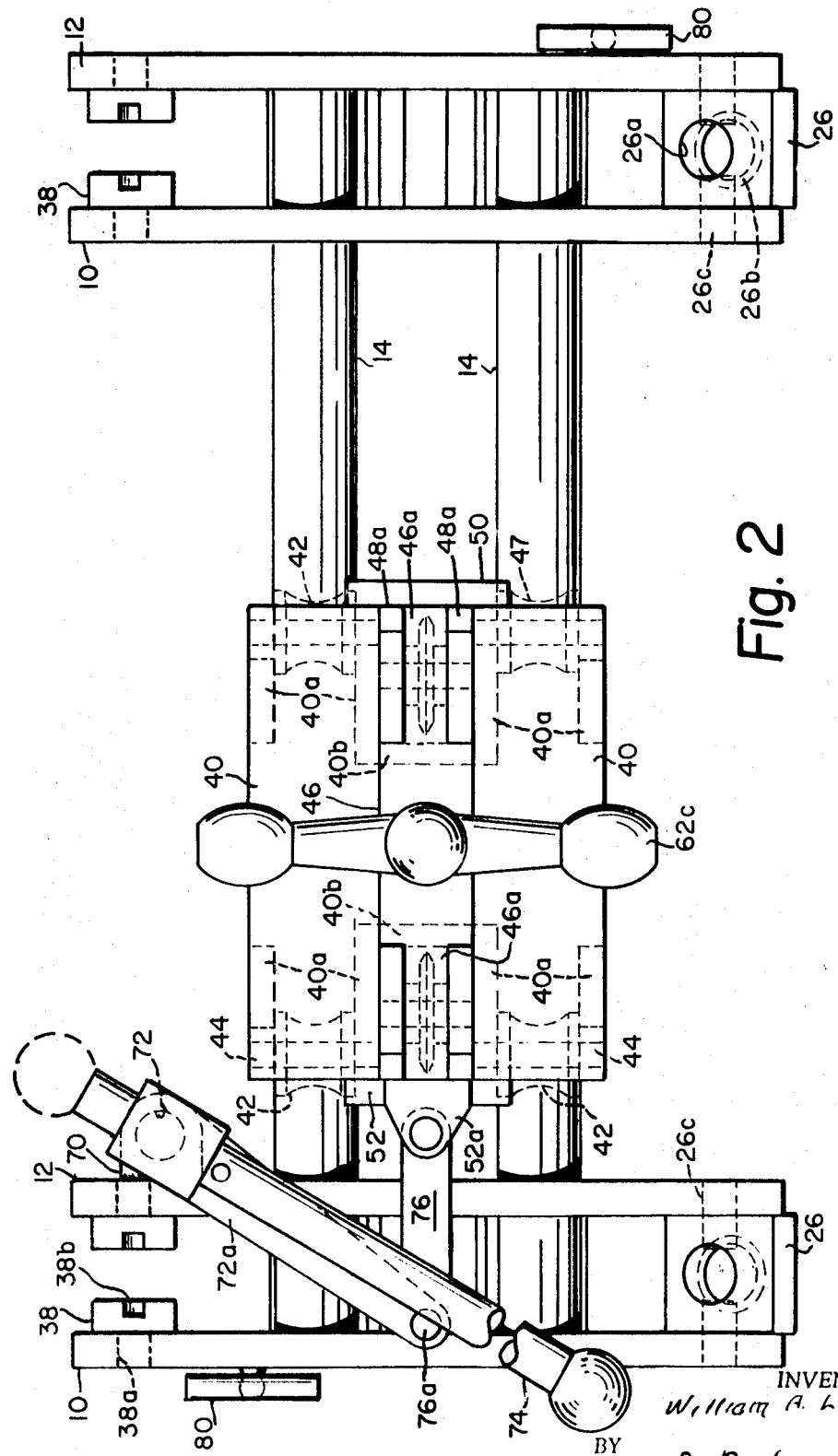
FIG. 2 is a view taken at 90° to FIG. 1, with the clamping chains and screws removed.

The carriage includes a generally H-shaped base 40, the contour of which is shown in dashed lines in FIG. 2, which has pairs of upwardly extending spaced apart roller supporting walls or members 40a bordering each of the legs defining the H. Concave ways engaging rollers 42 are disposed between the walls on pins 44, thus providing a roller for each corner of the base. The ways 14 pass between the rollers 42 and the upper wall of the base, the clearance being relatively close but sufficient to allow the carriage to roll on the ways with a minimum of friction.

The cutter support is a generally U-shaped member, FIG. 1, having a pair of legs, reciprocably guided by the base, that each support a cutter wheel. It includes a base that has a wide center portion 46, FIG. 2, in which the cutter advancing screw is journalled, and a pair of narrow parts 46a for cutter support members, extending from each end. The cutter support members or legs 48 include a pair of spaced apart rectangular side members 48a joined together in parallel relation at their mid-portion by a web 48b to provide slotted ends, the lower of which receives and is secured to the narrow part 46a of the base and the upper of which supports a cutter wheel 54 on a pin 56 extending through the walls. It is pointed out that the support could be made all in one piece instead of composite as illustrated.

The innermost of the roller supporting members 40a on the base 40 are joined by a wall 40b to provide vertically extending guide channels of transverse U shape midway between the way engaging rollers 42 for the legs of the cutter support. The U channels are closed at their outer ends by plates 50 and 52 secured to the edges of and bridging the pairs of members 40a.

The cutter wheel support is moved relative to the carriage to advance and retract the cutter wheels from the pipe by a feed screw. The base 40 is provided with an internally threaded bushing or nut 60 which is set into and secured in an opening centrally of the base. The cutter wheel support, at its enlarged mid-section 46 is provided with a bore through which a feed screw extends. The feed screw has a threaded shank 62 engaged with the threads in the nut. A lock ring 64 disposed in a groove on the shank above the base 46 holds it against downward movement. Anti-friction thrust washers or bearings 66 are disposed around the shank of the screw between the bottom of the base, as viewed in FIG. 1, and a collar 62a integral with the feed screw. An extension 62b of the feed screw is provided with an operating handle 62c on its end.

Means is provided for reciprocating the carriage longitudinally on the ways and includes a handle operated lever carried by one of the clamp means and connected by a pair of links to the carriage.

A pivot block 70 is welded to the side of the plate 12 of the left-hand clamp. It has a bore that receives the pivot pin 72 of the carriage reciprocating means which is captured by a cotter pin 72e disposed through the pin above a washer 72f. The carriage reciprocating means includes a lever 72a secured to the pin 72 by a pin 72b and a handle receiving block 72c secured to the lever opposite the pivot pin 72. An elongated handle 74 is slidably disposed in a bore 72d extending through the block. The handle may have ball ends 74a to prevent the removal from the block or it may be removable for carrying and storage. It is contemplated that with the removable handle a stop pin 74b may be provided to position the insertion of the handle. The free end of the lever 72a is connected by a pin 76a to the ends of a pair of spaced parallel links 76, disposed on each side of the lever and having their other ends pivotally pinned to a laterally extending lug 52a on the lower edge of the plate 52 which can extend slightly below the bottom of the carriage 40. When the handle 74 is moved to the right from the position as viewed in FIG. 2, the lever 72a is swung counter-clockwise moving the links to the right and moving the carriage to the right along the ways 14. Thus, the carriage may be reciprocated longitudinally on the ways. Carrying handles 80 may be provided on the end supports.

OPERATION

It being desired to cut a piece out of a pipe wall the usual pipe cutter is used to cut the end slits and then longitudinal cuts are made in the pipe to permit removal of a part of the pipe.

In cutting the longitudinal slits the cutter support is first retracted by rotating the screw 62 counter-clockwise. The machine is then placed with the jaws 20 of the end supports against the pipe and the chains 30 passed around the pipe and the free ends engaged in the saddles 38. The chain tension screw 28 is now rotated to pull down and to tighten the chain by the rotating of the nut and handle assembly 34–36a. Before final tightening of the chain the entire assembly may be rotated around the pipe to line up the cutter wheels 54 at the exact point where the cut is to be made. This can be accurately determined by advancing the cutter support until the wheels touch or are close to the desired line to be cut on the pipe.

The end clamps are now tightened to securely clamp the assembly to the pipe. Next, the carriage is reciprocated to and fro along the ways by reciprocating the handle 74. At the same time the cutter blades are advanced against the pipe by turning the feed screw and handle 62–62c. This is continued until the desired depth of cut is made which usually is through the pipe. The clamps are then loosened and the assembly slid around the pipe to the place where the second parallel cut is to be made and the process repeated. The device may now be removed.

It is contemplated that the end cuts be made first since this facilitates the displacement of the material in making the longitudinal slits. It is also contemplated that a section of approximately one-half the diameter of the pipe be removed to facilitate the installation of the lateral take-off coupling. The remaining section of pipe holds the ends of the pipe against movement.

What is claimed is:

1. A pipe slitter comprising a longitudinally extending frame, means at the frame ends to clamp said frame to a pipe, a carriage reciprocably mounted on the frame, and pipe cutting means carried by the carriage and arranged to be advanced into cutting relation with the pipe and means connected between the carriage and the frame for reciprocating the carriage longitudinally on the frame, said frame including a pair of spaced parallel members and said carriage being mounted thereon.

2. A device as described in claim 1 wherein rollers are carried by said carriage in engagement with the spaced parallel members.

3. A device as described in claim 2 wherein said carriage includes a base and pairs of said rollers are disposed in spaced parallel relation to each other on opposite ends of the base.

4. A device as described in claim 3 wherein said spaced parallel members are disposed between the rollers and the base of the carriage.

5. A device as described in claim 4 wherein said pipe cutting means has at least one cutting wheel support which is guided by the carriage.

6. A device as described in claim 5 wherein a screw is connected between the carriage and the cutting means for advancing the cutting means into cutting engagement with a pipe clamped to the frame.

7. A device as described in claim 1 wherein reciprocating means includes a lever pivotally mounted on the frame on an axis normal to the frame and a link means parallel to the frame connects said lever to said carriage.

8. A device as described in claim 7 wherein an operating handle is slidably mounted in the pivot for said lever.

9. A device as described in claim 1 wherein said clamp means includes a transversely extending portion with fixed clamp jaws carried thereby for engagement with one side of a pipe and a chain and screw means independent of the clamp jaws arranged to be disposed around the pipe to pull the paws into holding engagement therewith.

10. A device as described in claim 9 wherein said screw means includes a pivot block pivotally disposed in one end of said transversely extending portion and has a concave seat on one side and a screw passes through the block and a screw engaging member is threaded on the screw with a convex seat seated in the concave seat and one end of said screw is connected to one end of said chain, and socket means is provided at the other end of said transversely extending portion for engagement with said chain spaced from said screw means.

References Cited
UNITED STATES PATENTS

| | | | |
|---|---|---|---|
| 232,463 | 9/1880 | Cox | 269—87 X |
| 431,564 | 7/1890 | Denison | 30—92.5 |
| 2,875,828 | 3/1959 | Fleming | 81—9.51 X |
| 3,432,908 | 3/1969 | Miller | 29—237 |

FOREIGN PATENTS 115,426   12/1918   Great Britain.

ROBERT C. RIORDON, Primary Examiner

M. KOCZO, JR., Assistant Examiner

U.S. Cl. X.R.

83—487